US007755223B2

(12) United States Patent
Fitzgibbon

(10) Patent No.: US 7,755,223 B2
(45) Date of Patent: Jul. 13, 2010

(54) MOVABLE BARRIER OPERATOR WITH ENERGY MANAGEMENT CONTROL AND CORRESPONDING METHOD

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 608 days.

(21) Appl. No.: 10/227,182

(22) Filed: Aug. 23, 2002

(65) Prior Publication Data

US 2004/0227410 A1 Nov. 18, 2004

(51) Int. Cl.
*H02H 1/06* (2006.01)
*H02H 9/00* (2006.01)
*B66B 12/24* (2006.01)

(52) U.S. Cl. ........................................ 307/326; 187/317

(58) Field of Classification Search ................. 307/326; 187/317

See application file for complete search history.

(56) References Cited

U.S. PATENT DOCUMENTS 3,903,996 A * 9/1975 Berkovitz et al. ........... 187/316
4,263,536 A 4/1981 Lee
4,621,452 A * 11/1986 Deeg ............................. 49/28
4,733,158 A * 3/1988 Marchione et al. .......... 323/258
4,914,859 A * 4/1990 Gionet et al. .................. 49/25
5,149,921 A * 9/1992 Picado ....................... 187/317
5,233,185 A * 8/1993 Whitaker ................. 250/222.1
5,282,337 A * 2/1994 Duhame et al. ............... 49/199
5,285,136 A * 2/1994 Duhame ..................... 318/266
5,357,183 A * 10/1994 Lin ............................ 318/468
5,428,923 A * 7/1995 Waggamon .................... 49/28
5,465,033 A * 11/1995 Fassih-Nia .................. 318/480
5,493,812 A 2/1996 Teich
5,584,145 A 12/1996 Teich
5,656,900 A * 8/1997 Michel et al. ............... 318/286
6,005,780 A * 12/1999 Hua ............................ 363/20
6,181,095 B1 * 1/2001 Telmet ....................... 318/480
6,184,641 B1 * 2/2001 Crimmins et al. ........... 318/466
6,194,851 B1 * 2/2001 Denault et al. .............. 318/139
6,243,006 B1 * 6/2001 Rejc et al. .................. 340/436
6,247,558 B1 * 6/2001 Bailey et al. ................ 187/317
6,329,779 B1 * 12/2001 Pimley et al. ............... 318/445
6,597,589 B2 * 7/2003 Wang ...................... 363/21.18

(Continued)

FOREIGN PATENT DOCUMENTS

EP 0777029 6/1997

(Continued)

*Primary Examiner*—Stephen W Jackson
*Assistant Examiner*—Adi Amrany
(74) *Attorney, Agent, or Firm*—Fitch Even Tabin & Flannery

(57) ABSTRACT

A movable barrier operator system wherein one or more of the various components of the system is configured to operate selectively in at least either of two operational modes. Each operating mode is characterized by a corresponding energy usage profile. The operational status of the system is monitored and operating modes are selected that serve both to substantially ensure proper operation given current likely operational expectations and an overall desire to reduce energy consumption.

34 Claims, 6 Drawing Sheets

U.S. PATENT DOCUMENTS 6,737,968 B1 * 5/2004 Ergun et al. ................. 340/540
6,904,717 B2 * 6/2005 Clark et al. .................... 49/28
7,081,713 B2 * 7/2006 Jurs et al. ................... 315/134
7,221,288 B2 * 5/2007 Fitzgibbon et al. .......... 340/933
6,621,256 B2 * 9/2003 Muratov et al. ............. 323/282
6,622,925 B2 9/2003 Carner et al.
6,633,823 B2 10/2003 Bartone et al.
6,732,476 B2 * 5/2004 Mehalshick et al. ........... 49/506

FOREIGN PATENT DOCUMENTS

EP 1008233 7/1997
GB 2282639 4/1995
GB 2 361 310 A 10/2001
GB 2 406 880 A 4/2005

* cited by examiner

MOVABLE BARRIER OPERATOR WITH ENERGY MANAGEMENT CONTROL AND CORRESPONDING METHOD

TECHNICAL FIELD

This invention relates generally to movable barrier operators and more particularly to energy management in such an operator.

BACKGROUND

Movable barrier operators are well understood in the art and include a wide variety of openers for garage doors (with both residential and commercial/industrial variations being available), sliding and swinging gates, rolling shutters, and so forth. Such operators usually include a programmable platform comprising a programmable gate array, a microcontroller, a microprocessor, or the like that controls various operational states of the operator (including movement of a corresponding barrier, light operation, state monitoring, unauthorized entry detection, and so forth). Many operators also include other elements and components including but not limited to a motor and motor controller, a motor RPM detector, one or more wired remote control interfaces that are at least semi-permanently mounted remotely from the movable barrier operator itself, a wireless remote control interface, one or more worklights, and an obstacle detector, to name a few. Such operators also typically include a power supply to provide energy for all of the above components.

In general, movable barrier operators are designed to provide full power at all times to all elements of the system. For example, an obstacle detector (and the circuitry/logic that monitors and responds to the obstacle detector) will frequently be active and fully powered regardless of whether the corresponding barrier is opened or closed. As a result, the average power draw of a typical prior art movable barrier operator over time is often likely to be higher than might genuinely be merited. For example, many movable barrier operators draw more than five watts of power even during a relatively quiescent state such as when the corresponding barrier is fully closed.

Also, the power supply for many movable barrier operators tends to be simplistic and relatively static in operation in that the power supply is designed and built to operate at full capacity and provide full potentially necessary operating power to all components of the movable barrier operator regardless of the genuine need at any given moment for such power. Waste heat production and radiation due to the power supply design (often primarily due in many cases to the power supply transformer) alone can account for a considerable portion of the so-called stand-by energy needs of a prior art movable barrier operator.

BRIEF DESCRIPTION OF THE DRAWINGS

The above needs are at least partially met through provision of the movable barrier operator with energy management control and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a movable barrier operator that includes a motor and a plurality of additional components has at least a first mode of operation and a second mode of operation. In the first mode of operation, the operator automatically initiates (following at least apparent attainment of a given operational state) one or more actions that configures or otherwise controls one or more components of the movable barrier operator to effect, in part, a particular corresponding level of energy consumption. In a preferred embodiment, this level of energy as provided pursuant to the first mode of operation is sufficient to power at least most of the components in a substantially fully-active mode of operation. In the second mode of operation, the operator automatically initiates (again preferably based on some indicia of an attained operational state) one or more actions that configures or controls the movable barrier operator to effect, at least in part, a reduced corresponding level of energy consumption.

By appropriate selection of the dynamic alterations that facilitate the selection of reduced energy consumption operating states, and by appropriately selecting when to use such operating states, operational efficacy and safety are not unduly compromised while simultaneously achieving considerable power savings over time.

In differing embodiments, various alterations can be introduced for use with various ones of the components to realize the dynamically utilized reduced energy consumption needs of the components and/or overall operator. Varying levels of energy savings are typically possible with, for example, the motor RPM sensor, the movable barrier operator itself, the radio that supports the wireless user interface, the wired remotely disposed user interface, and the obstacle detector, to name a few. In addition, the power supply can be more efficiently designed and/or provided with dynamic reconfigurable functionality to also support immediate and/or average energy usage reductions.

Figure 1:
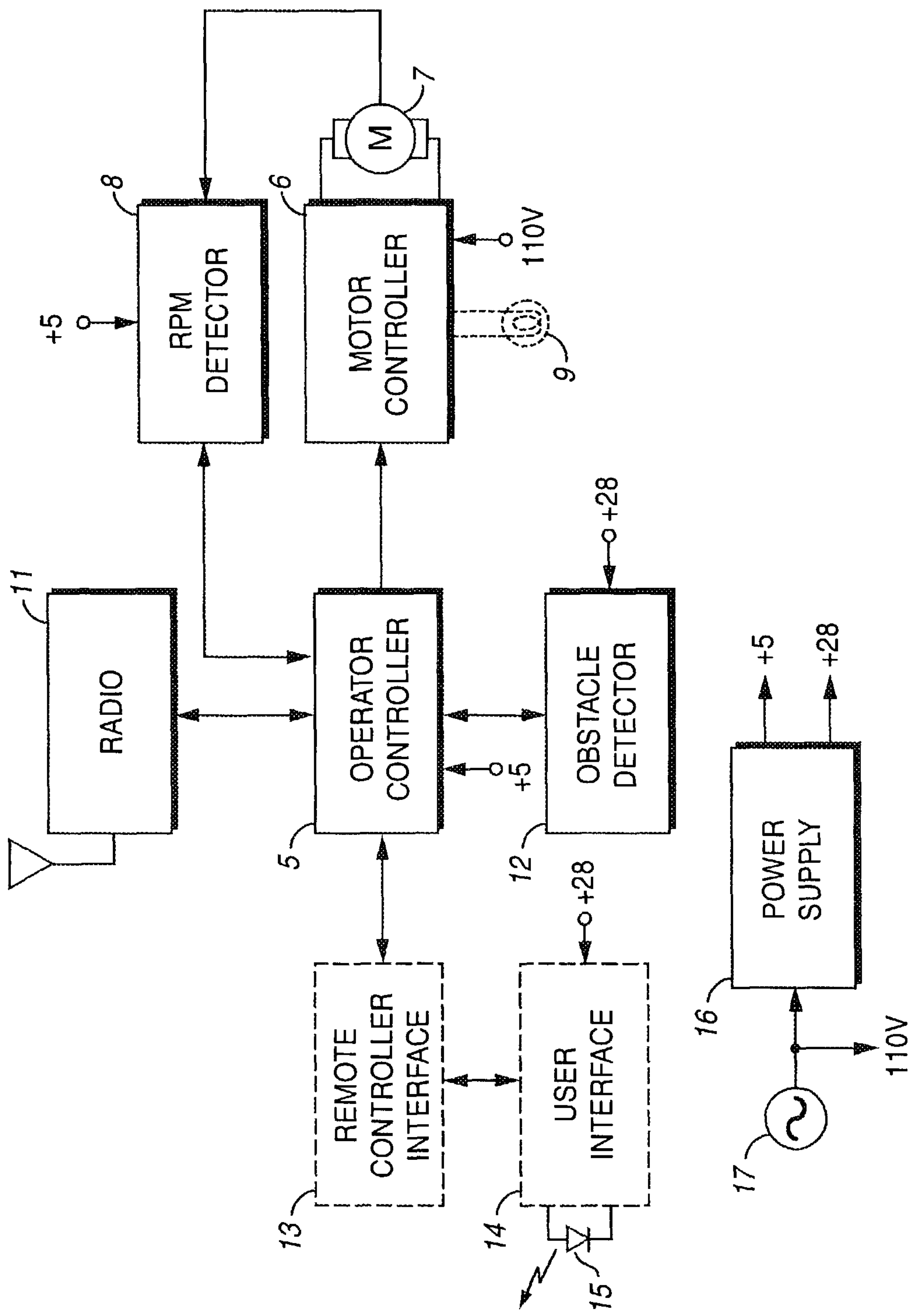
FIG. 1 comprises a block diagram view of a movable barrier operator as configured in accordance with an embodiment of the invention.

Referring now to FIG. 1, a movable barrier operator system can include, for example, an operator controller 5 that serves to interact with a variety of other components of the operator system. Such controllers 5 are well known in the art and usually comprise a programmable platform (such as a microprocessor, microcontroller, programmable gate array, or the like) that is readily amenable to such alterations as are suggested below in these various embodiments. The operator controller 5 couples to a motor controller 6 that in turn couples to a motor 7. So configured, the operator controller 5 controls the motor controller 6 and the motor controller 6 in turn converts such control information into specific drive signals for the motor 7 to thereby cause the motor to function in a specifically desired fashion. (The motor 7 will usually be coupled to a movable barrier through any of a variety of well understood drive mechanisms. For the sake of brevity and the preservation of focus, additional detail will not be presented here regarding such well understood peripheral structure.)

In addition, in this embodiment, a worklight 9 provides light (for example, upon opening or closing a garage door for a short predetermined period of time). Such a worklight 9 can share a common housing with the motor 7 and motor controller 6 or can be remotely mounted. In addition, two or more such worklights can be provided. When multiple worklights are used, such lights can operate in parallel or can respond to differing control strategies as desired for a particular application.

In a preferred embodiment, an RPM detector 8 provides information regarding the mechanical output of the motor 7 to the operator controller 5. In a preferred embodiment the RPM detector 8 will include one or more optical sensors and a light source wherein one moves with respect to the other as a given output member (such as an output drive shaft) rotates. The resultant signals will be synchronized to the rotation of the motor 7 and hence provide the desired RPM information. There are other ways, however, to provide such information and this particular embodiment should be viewed as being illustrative rather than limiting.

A radio 11 (typically comprising a receiver though two-way capability can be provided as appropriate to suit the needs of a given situation) serves to receive wireless remote control signals and to provide such received signals to the operator controller 5.

An obstacle detector 12 of choice couples to the operator controller 5 and serves primarily to detect when an obstacle lies in the path of the moving barrier. The operator controller 5 uses such information to control the movable barrier accordingly (for example, to cause a closing moving barrier to stop or reverse direction upon detecting an obstacle in order to avoid injuring the obstacle or the movable barrier itself). A variety of known obstacle detectors exist For purposes of this illustration, the obstacle detector 12 is comprised of a photobeam-based obstacle detector.

Figure 2:
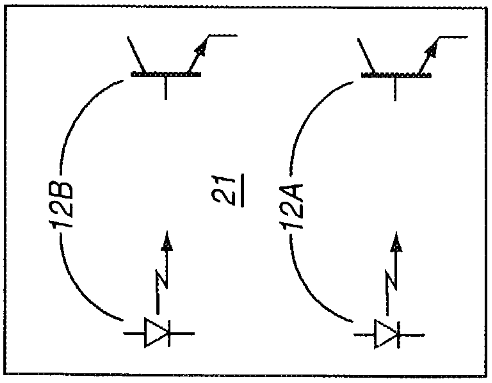
FIG. 2 comprises a schematic front elevational view of an obstacle detector as configured in accordance with an embodiment of the invention.

Referring momentarily to FIG. 2, a pair of photobeam elements 12A (such as a source and a receptor) are positioned near the bottom of an opening 21 (such as a garage opening) to detect when an obstacle is disposed within the opening 21 and hence potentially within the path of the moving movable barrier (not shown) As well understood in the art, additional such pairs of photobeam elements 12B can be disposed at other locations within the opening 21 to improve the likelihood of detecting a given obstacle. Typically in such an arrangement, the photobeam sources are energized on a relatively frequent basis and usually are substantially continuously energized.

Figure 3:
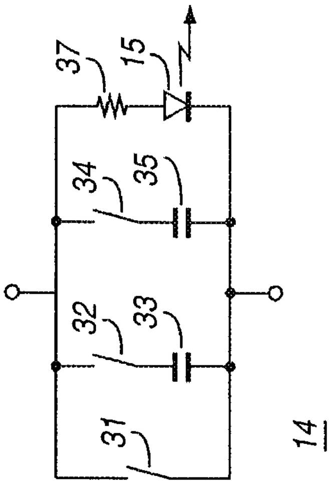
FIG. 3 comprises a schematic view of the switches of a remotely disposed user interface as configured in accordance with an embodiment of the invention.

In this embodiment the operator controller 5 also couples to a wired remotely disposed user interface 14 via a remote controller interface 13. The remotely disposed user interface 14 typically includes one or more user assertable buttons and often include one or more display elements (such as one or more light emitting diodes 15). The buttons serve to permit a user to signal the operator controller 5 to, for example, move the movable barrier, to switch on or off the worklight 9, or to facilitate some other communication (for example, to place the operator controller 5 into a so-called vacation mode of operation). There are various known ways to facilitate the provision of such a user interface 14. For purposes of this illustration, and referring momentarily to FIG. 3, three user assertable switches 31, 32, and 34 are arranged in parallel with one another, with the latter two switches 32 and 34 also being arranged in series with a corresponding capacitor 33 or 35 respectively. A parallel-configured series-coupled resistor 37 and light emitting diode 15 complete a typical user interface 14 of this type. So configured, the remote controller interface 13 will pulse the above-described circuit with 28 volts DC from the power supply 16 (the power supply is described below) and then monitor the electrical response of the user interface circuit. By varying the values of the capacitors 33 and 35, one can rapidly ascertain when a given switch has been closed by a user as well as identify the particular switch.

As already noted for some of the above specific elements, all of these components are well understood in the art. This understanding includes knowledge regarding a variety of ways to facilitate the realization of each described function. Additional description has therefore not been provided for these various components. In addition, there are other components that can be utilized in conjunction with such an operator controller, including Bluetooth-style data link modules, carbon monoxide detectors, smoke detectors, and so forth. It should be clearly understood that the embodiments described below are compatible with and suitable for use with such other components as well as the specific components and elements that are generally depicted in FIG. 1.

All of the above components, including the operator controller 5 itself, utilize electricity. Some (such as the motor 7 and the worklight 9) utilize standard 110 volt alternating current. Others (such as the obstacle detector 12 and the user interface 14) utilize, in this embodiment, 28 volts direct current. Yet others (such as the operator controller 5 and the RPM detector 8) utilize, in this embodiment, 5 volts direct current. Such electricity can be provided in a wide variety of ways, including through use of multiple independent power supplies. More typically, however, a single power supply 16 serves to supply the power needs of all the components in the system. So configured, in this embodiment, the power supply 16 couples to a standard source 17 of alternating current. The AC power is made available via the power supply 16 to those elements that require it. That AC power is also processed to yield both the 5 volt and the 28 volt DC power signals noted above.

Figure 4:
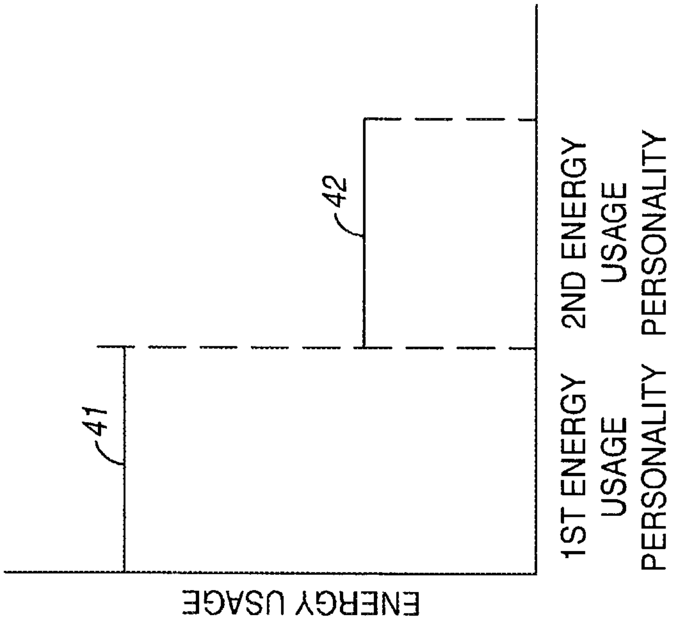
FIG. 4 comprises a graph that generally illustrates energy usage for differing energy usage personalities for movable barrier system elements as configured in accordance with an embodiment of the invention.

As already noted, a typical movable barrier operator will have a power supply that provides full power at all times and all of the components will be operating in a full power stand-by mode as well. This does not mean, of course, that all of the components utilize maximum power at all times. For example, the motor 7 only draws full power when it is operating. But, as an example, the RPM detector 8 in a prior art configuration will draw full power even when the motor 7 is quiescent and there are no revolutions to detect. Pursuant to these embodiments, various components are configured to have at least two energy usage personalities. That is, when the operator controller 5 operates in a first mode of energy consumption operation, at least one of these components will operate using a first energy usage personality. Similarly, when the operator controller 5 operates using a second mode of energy consumption operation, that same component will operate using a second energy usage personality. With reference to FIG. 4, and seeking only to illustrate the point generally at this time, the first energy usage personality will tend to comprise a first average level 41 of energy usage and the second energy usage personality will tend to comprise a second average level 42 of energy usage that is less than the first average level 41. So configured, the operator controller 5 will now have the ability to manage the energy usage of one or more components of the system by selecting between at least these two modes of operation.

Figure 5:
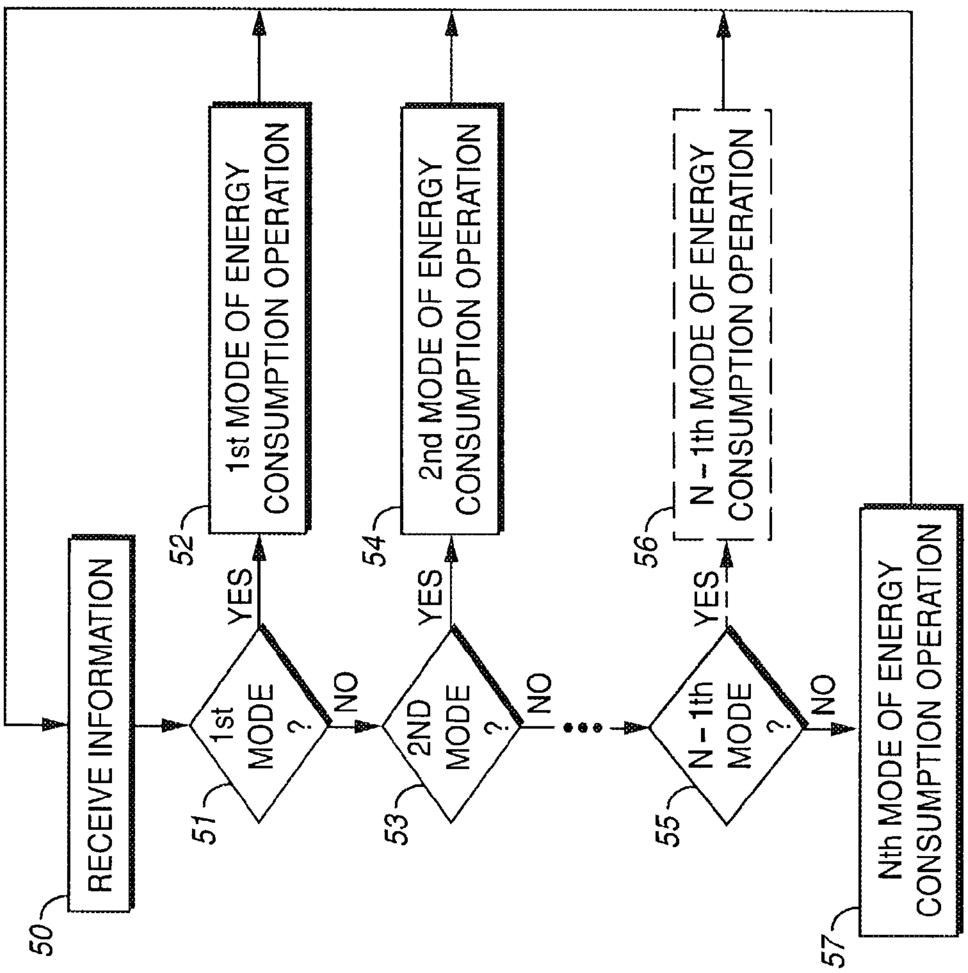
FIG. 5 comprises a flow diagram as configured in accordance with an embodiment of the invention.

As noted above, the operator controller 5 comprises a programmable platform. Pursuant to these embodiments, the operator controller 5 is programmed to select from amongst a plurality of energy management operating modes as a function, at least in part, of the operational status of one or more elements of the system itself and/or the movable barrier. Generally speaking, and with reference to FIG. 5, the operator controller 5 receives 50 information and then uses this information to determine 51 whether to operate in a first mode of operation 52, to determine 53 whether to operate in a second mode of operation, and so forth. If desired, any number N of operating modes can be defined and accommodated, such that a determination 55 is eventually made as to an N−1th mode of operation 56 and a final Nth mode of operation. For purposes of clarity, however, in this illustration only two such modes of operation will henceforth be discussed and elaborated upon.

The information received 50 by the operator controller 5 can comprise, for example, information regarding one or more operational states of the movable barrier operator system. Such information could reflect, for example, that the movable barrier is at a particular position and/or is stationary at either of a fully opened or a fully closed position. The monitored operational state can further include, in a preferred embodiment, a temporal aspect as well. For example, the information can specifically reflect that a given stationary position of the movable barrier has been continuously maintained for at least a predetermined period of time (such as a specific number of seconds or minutes). When the movable barrier is at a fully opened or especially at a fully closed position, the operational state of the system often comprises a quiescent state, and especially so when the stationary position has been continuously maintained for a period of time.

Each operating mode as is selectable by the operator controller 5 pursuant to this approach can have a corresponding level of energy consumption. Through this process, the operator controller 5 establishes a level of operability that is appropriate and commensurate with the likely needs of the system at a given point in time. More particularly, the operator controller 5 further selects operating modes that tend to result in a reduced level of energy consumption for at least some levels of maintained activity. In general, little or no reduction in energy consumption during high levels of usage are especially expected through this approach. Since most moving barrier operator systems spend most of their time in a fully or partially quiescent operating state, however, considerable opportunity exists for energy savings during such periods.

As one illustrative example, consider the above process as applied to an obstacle detector 12. As already described, the obstacle detector 12 in this embodiment includes two pairs 12A and 12B of photobeam elements that are positioned within the opening 21 that is governed by the movable barrier. The obstacle detector 12 serves an important safety purpose. In this regard, when the operator controller 5 receives 50 information indicating that the movable barrier is moving from an open to a closed position, a first mode of energy consumption operation 52 that comprises, in this example, normal full energization and operation of the obstacle detector 12 is appropriate to ensure that this feature is fully enabled. Once the movable barrier has moved to a fully closed position, however, and further has remained in that position for a predetermined period of time (such as, for example, five minutes), this information as received 50 by the operator controller 5 can be used to select instead a second mode of energy consumption operation 54. In this embodiment, pursuant to the second mode of energy consumption operation, one pair 12B of the photobeam elements can be switched off, thus saving 50% in energy utilized to power the photobeam operation. This energy savings is achieved at the expense of now providing only one pair of photobeam elements, of course. By ensuring that such a selection only occurs when the movable barrier is fully closed, however, such a compromise will be quite reasonable for many applications.

The above example is intended to be illustrative only, of course, and there are other ways to achieve an energy savings in the same situation. For example, the periodicity or duty cycle for energizing the photobeams elements 12A or 12B can be reduced. Instead of continuous or near-continuous energization, the elements can be strobed on a less frequent basis. In this and other ways as will occur to one skilled in the art, the energy consumption operating mode of the obstacle detector 12 is controlled while simultaneously assuring that the operability and efficacy of the overall system is not unduly compromised.

Figure 6:
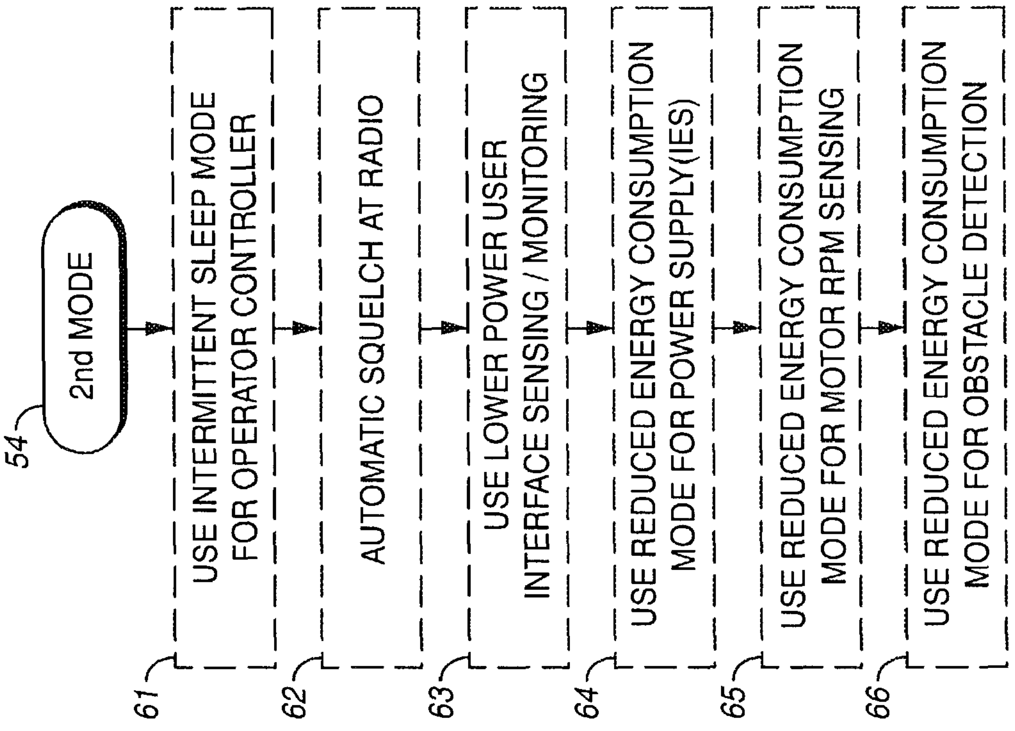
FIG. 6 comprises a flow diagram as configured in accordance with an embodiment of the invention.

In a simple system where only two operating modes are available for consideration, again, the first mode is likely to represent a full-power mode suitable for use during ordinary operations. The second mode, however, can be used to modify the energy consumption of any given component of the system or any combination of components. For example, and referring now to FIG. 6, the second mode 54 can be used to optionally modify and reduce the energy usage of any of the operator controller itself 61, the radio 62, the remotely disposed user interface 63, the power supply 64, the motor RPM detector 65, and/or the obstacle detector 66 (as well as any other components or features that have been incorporated into a given movable barrier operator system). A number of examples will now be provided as exemplary illustrations of how energy management options can be realized for each such component/function.

The Operator Controller

The operator controller 5 can be configured to toggle itself between an ordinary mode of operation and a so-called sleep mode of operation. During a sleep mode of operation, the processing platform that comprises the operator controller 5 can power down significant portions of its relevant circuitry and then only intermittently re-power such circuitry to respond to any system needs that may have arisen in the meantime. As another example, significant portions of the processing platform can be powered down and left powered down. A remaining portion of the platform can serve to receive signals that indicate when processing requirements now exist and to interrupt and awaken the remaining circuitry to tend to the task at hand. Such operating modes are generally well understood in the art for microprocessors and the like though used uniquely here to facilitate the energy management of a movable barrier operator system.

The Radio

The radio is ordinarily on at all times and available to receive remote control transmissions from a corresponding wireless remote control user device as well understood in the art. The operator controller 5 could be configured to receive 50 information regarding the fully open status of the movable barrier, which status has been maintained for at least a predetermined period of time (such as, for example fifteen minutes). A second mode of operation 54 could configure the radio 11, under such conditions, to enter an intermittent mode of operation. For example, the radio receiver could be cycled on and off for brief intervals in accord with a predetermined duty cycle, such as fifty percent. So configured, energy consumption for the radio would drop during a period of time when a wireless transmission from a user is statistically somewhat less likely (at least for some applications and installations).

As another example, the radio 11 could be configured, pursuant to a second mode of operation, to effect a local squelch function (whereas in ordinary course, the squelch function may be handled by the operator controller 5). Doing this, of course, would possibly increase the energy requirements of the radio 11, but would permit the operator controller 5 to be relieved of this function. Accordingly, this offloading of functionality might then more readily permit a complete (possibly intermittent) powering down of the operator controller 5 into a sleep mode as suggested above. So configured, it can be seen that the functionality of one component can be modified in order to effect a corresponding change in functionality elsewhere in the system along with a commensurate reduction in energy consumption. (Whether such a shifting will result in an overall reduction in energy consumption for a given system will of course vary with respect to the system itself.)

The Remotely Disposed User Interface

As noted above, during ordinary (first mode) operation, this interface 14 can illuminate display elements such as one or more light emitting diodes 15. For example, such a display can be provided in order to provide a location beacon to aid a user in finding the interface 14 under darkened circumstances. By using information regarding available light (such as can be obtained through use of, for example, a photocell circuit as well understood in the art), the operator controller 5 can receive 50 information regarding ambient light and use this information to select a second mode of operation 52 wherein such a light emitting diode 15 is powered down (this being based upon the supposition that such a beacon is not especially helpful when the interface 14 is otherwise readily viewable given present lighting conditions).

As another example, it was disclosed above that a particular switch closure sensing mechanism is used in many such interfaces 14 wherein a 28 volt pulse is repeatedly sent to the interface 14 such that the remote controller interface 13 can thereby actively sense the closure and identity of a given switch. Upon receiving 50 information that indicates a particular operational state (such as, for example, that the movable barrier is and has been fully closed for at least a predetermined period of time), the operator controller 5 can effect a second mode of operation 52 that utilizes an alternative, less energy-consumptive switch sensing mechanism. For example, whereas the primary mode of operation provides for actively sensing a closed circuit, a second mode of operation can instead more passively detect charging of the capacitors 33 and 35 in the interface circuit as described earlier. Sensing switch closure in this fashion is not as rapid or necessarily as accurate as the use of active sensing, but the energy expenditure required for the second mode of operation is also considerably reduced. By limiting use of the less operationally optimum but more energy efficient second mode of operation to circumstances where actual usage of the interface 14 is less likely, overall energy management is served without significant impairment of the overall operation of the system.

The Power Supply

Figure 7:
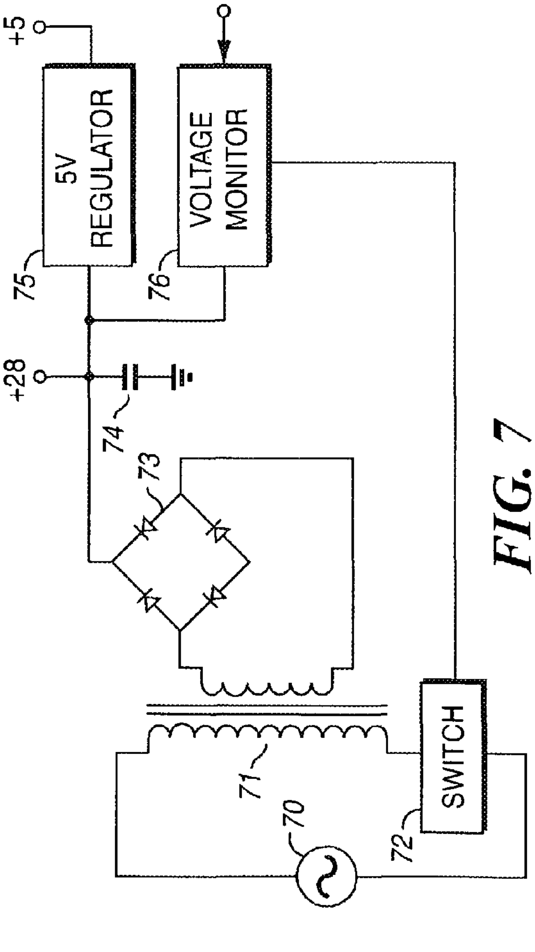
FIG. 7 comprises a schematic view of a power supply as configured in accordance with an embodiment of the invention.

A number of improvements can be made with respect to energy efficiency of the power supply and/or its interaction with the remainder of the system. For example, with reference to FIG. 7, a transformer 71 as coupled to a source of alternating current 70 can have a switch 72 coupled in series with a primary winding thereof. The secondary winding of the transformer 71 couples through a rectifier 73 and provides a 28 volt DC output in accordance with well understood practice (other typically appropriate components, such as filtering capacitors and the like, are not shown for purposes of clarity). This 28 volt line is then coupled to the input of a 5 volt DC regulator 75 that serves to provide the 5 volt power signal required by some of the components of the system as related above. In this embodiment, however, an energy storage capacitor (or capacitors, with only one being shown for the sake of simplicity) 74 is disposed and will serve to store voltage at the input to the 5 volt regulator 75. In addition, a voltage monitor 76 is coupled to detect the voltage level at the input to the 5 volt regulator 75 and to provide a corresponding control signal to the switch 72 that controls the flow of current through the transformer 71 primary winding.

During ordinary operation, when all power is to be made available to all components of the system (for example), the switch 72 remains closed and 28 volts and 5 volts remain fully available at all times to all components. During more quiescent modes of operation, however, the second mode of operation 54 can provide for essentially shutting down the 28 volt supply (which will shut down, partially or completely, those components that ordinarily require such a supply to operate in an ordinary fashion). At the same time, however, the energy storage capacitor 74 will be able to maintain a supply of 5 volts at the output of regulator 75 for short periods of time. The voltage monitor 76 can detect when the voltage across this capacitor 74 is falling too low (such as, for example, below 7 volts) and can then close the switch 72. This will permit the building up of voltage across the capacitor 74 and will also result in a still-continuing availability of 5 volts at the output of the regulator 75. The voltage monitor 76 can again cause the switch 72 to open when the voltage across the capacitor 74 reaches or exceeds some predetermined threshold (such as, for example, 12 volts). By toggling back and forth in this fashion, 5 volts remains available to power certain components (or portions of components as the case may be) but the 28 volt components are essentially powered down. As a result, energy requirements are greatly reduced when operating in this fashion. If, in a given embodiment, there are components that require 28 volts that should not be shut down in this fashion, it would be possible to provide two power supplies, wherein one supply continues to provide 28 volts to such components and the other supply operates as just described to reduce power availability to those components where such denial is acceptable and to otherwise provide 5 volt power to the remaining components.

Figure 9:
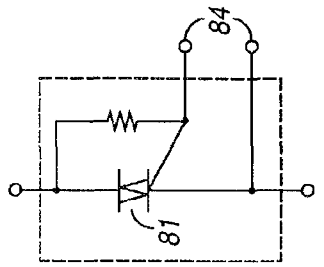
FIG. 9 comprises a detailed schematic view of a portion of a power supply as configured in accordance with another embodiment of the invention.
Figure 8:
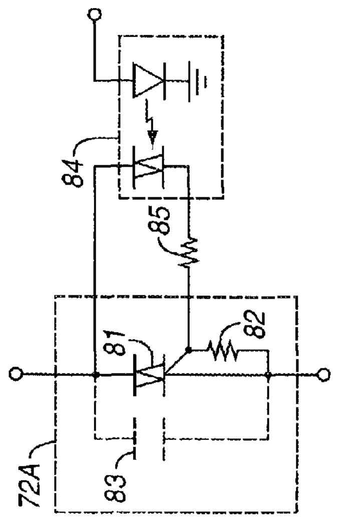
FIG. 8 comprises a detailed schematic view of a portion of a power supply as configured in accordance with an embodiment of the invention.

There are a variety of ways by which the switch 72 can be realized. For example, the switch 72 can be comprised of a relatively small low power relay (especially when the pulse rate is relatively slow). The switch 72 could also be realized through appropriate use of an active device such as, for example, a triac. For example, as shown in FIG. 8, the switch 72A can comprise a triac 81 coupled in series with the primary of the transformer (not shown in this figure). The triac 81 will preferably have a resistor coupled between its control input and ground. (In addition, if desired, a passive device such as a capacitor 83 can be disposed in parallel with the triac 81. This capacitor 83, which is also, of course, disposed in series with the primary winding of the transformer, will limit the amount of energy in the primary when the triac is off and will thereby limit the amount of energy in the secondary. With less energy in the core, the transformer will typically function more efficiently.) So configured, the triac 81 can operate as a switch element being either on or off as desired to support corresponding power requirements. Also as shown in FIG. 8, the voltage monitor 76 can effect provision of control signals via an optical coupler 84 and coupling resistor 85 as are well known in the art. In this particular embodiment, the optical coupler 84, when energized, will switch on the triac 81. If desired, and as shown in FIG. 9, the optical coupler 84 (or other isolation coupler of choice) can instead be connected across the triac 81 so that energizing the triac 81 will short the control gate of the triac 81 and thereby switch the triac 81 off.

Figure 10:
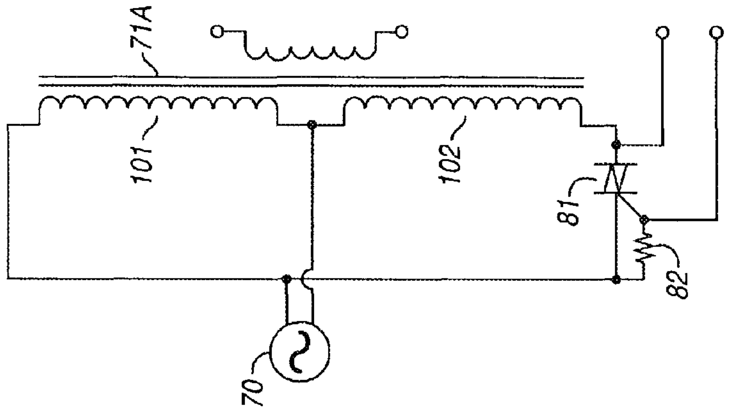
FIG. 10 comprises a detailed schematic view of a portion of a power supply as configured in accordance with yet another embodiment of the invention.
Figure 11:
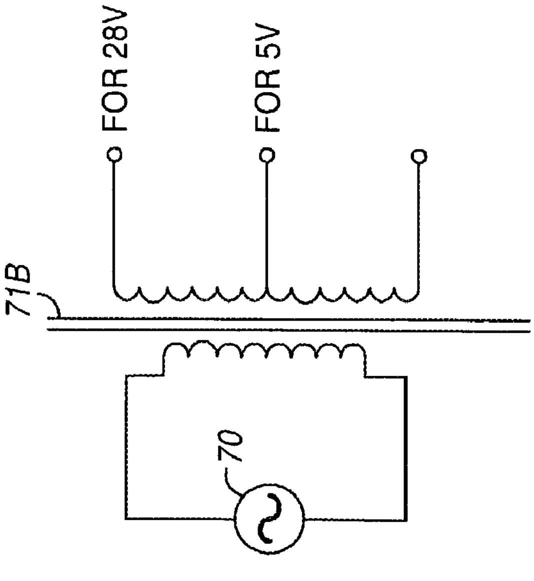
FIG. 11 comprises a detailed schematic view of a portion of a power supply as configured in accordance with yet another embodiment of the invention.

Yet other useful and applicable power supply embodiments are possible as well. For example, with reference to FIG. 10, the power supply transformer 71A can be comprised of a split primary 101 and 102. A first primary section 101 would comprise a low power primary to supply power during, for example, a second mode of operation. The second primary section 102 could comprise a higher power primary that is switched in via a switch 81 as needed during higher power modes of operation. As yet another example, and referring now to FIG. 11, the secondary of the power supply transformer 71B can be split or tapped to provide two different resultant voltage levels. While such a design is not especially dynamic in that it does not switch between such voltage levels in response to changing operational states, it may, under at least some operating conditions, represent a more efficient overall design.

Figure 12:
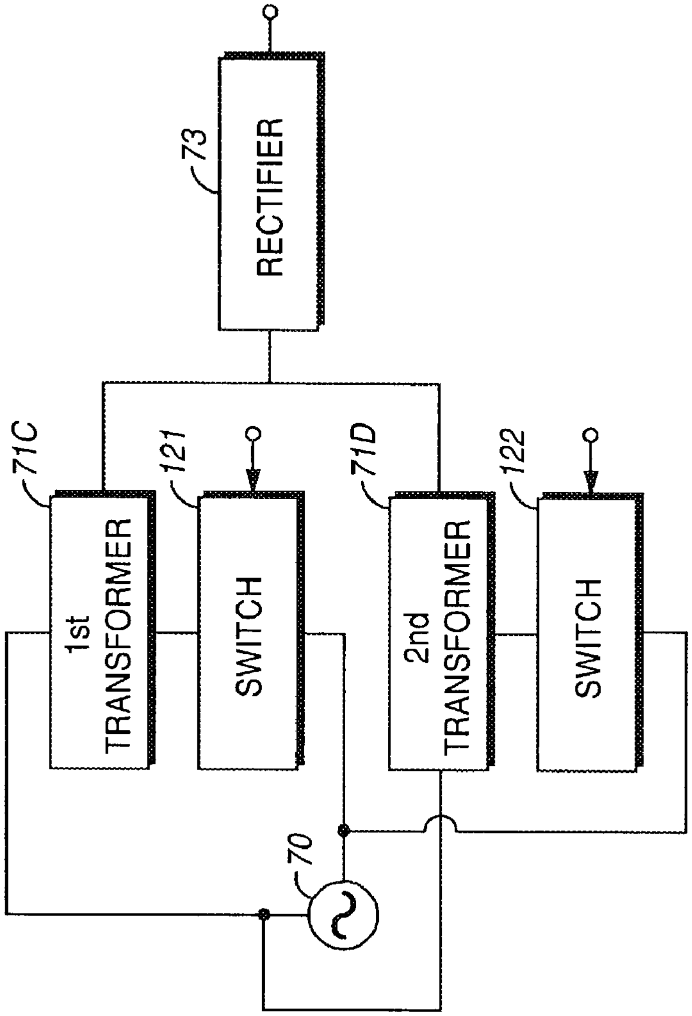
FIG. 12 comprises a block diagram view of a portion of a power supply as configured in accordance with another embodiment of the invention.

As noted above, more than one power supply may be appropriate in some circumstances to support dynamic reconfiguration for energy management purposes. With reference to FIG. 12, a first and second transformer 71C and 71D can each be configured in series with a switch 121 and 122 respectively (the switch can be coupled in series with the primary or the secondary winding of the power supply transformer of each power supply as appropriate to the particular needs of the application). So configured, the switches 121 and 122 can respond to appropriate control signals from the operator controller 5 to open or close and thereby combine or isolate the transformers 71C and 71D to provide resultant corresponding power capabilities as limited and/or as unlimited as may be desired.

As already noted, various components of the movable barrier operator system can be configured to effect dynamic changes in response to certain operational states to thereby minimize the power requirements of such components. By also modifying the power supply to itself reduce its power provisioning capabilities in tandem with such dynamic alterations to the components, significant energy savings can be attained.

The RPM Detector

The RPM detector 8, at a minimum, expends energy to sense a signal that relates to the position of an object that itself correlates to the position of the output shaft of the motor. Often, the detector 8 will also expend energy to create that signal to be sensed. When the system attains a quiescent state such as occurs when the movable barrier is and has been fully closed for at least some predetermined period of time, a second mode of operation 54 can include reducing the duty cycle of so energizing the detector 8 and/or powering down the detector 8 completely.

The Obstacle Detector

As already described above, a photobeam-based obstacle detector 12 can be configured to permit reduction of the energization cycle and/or complete powering down to accommodate a reduced energy consumption mode of operation. Other embodiments are of course possible. For example, in some embodiments, the remotely disposed wired user interface 14 will include a passive infrared (PIR) device that can detect the presence of a human in the vicinity of the system. To the extent that a system utilizes the obstacle detector 12 to also detect the presence of a person and to trigger the illumination of the worklight 9 in response to such detection, when at least a quiescent condition has been reached where the movable barrier is and has been closed for at least a predetermined period of time, control of the worklight 9 can be left exclusively to the PIR device and the obstacle detector 12 can be relieved of this function. This, in turn, may more readily facilitate the partial or complete powering down of the obstacle detector 12 as already suggested above.

So configured, it can be seen that one or more components of a movable barrier operator system can be configured to operate in at least two different modes of operation, wherein each mode has a differing corresponding energy consumption profile. The mode that requires less energy is frequently less optimum with respect to performance. By matching use of such lower power modes of operation with operational states that present reduced operational challenges, however, a reasonable compromise can be reached as between operational efficacy on the one hand and well managed energy usage on the other.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A movable barrier operator apparatus comprising:

a power supply that operably couples to at least one source of alternating current;

an obstacle detector; and a movable barrier operator which includes a controller, the movable barrier operator operably coupled to the power supply, receives operating power from the power supply and has at least a first and a second mode of energy consumption operation and being further configured and arranged to:

selectively open and close a corresponding movable barrier; and develop an obstacle detector operating mode control signal from the controller as a function of movable barrier operator system state information that indicates whether the barrier is open or closed, the obstacle detector operating mode control signal being operable to directly control the energy usage of the obstacle detector, the control signal from the controller developed as a result of the state information, the state information selected from the group consisting of motor state information, time information, transmission state information, voltage state information, switch state information and combinations thereof, the obstacle detector operably coupled to the power supply and to the movable barrier operator, receives operating power from the power supply, and has a plurality of operating modes, wherein at least some of the operating modes have different energy usages, and wherein the obstacle detector is directly responsive to the movable barrier operator obstacle detector operating mode control signal such that:

during the first mode of energy consumption operation, the obstacle detector operates using a first energy usage; and during the second mode of energy consumption operation, the obstacle detector operates using a second energy usage, wherein the operating power used in one of the energy usages is less than the power used by the other energy usage.

2. The movable barrier operator apparatus of claim 1 wherein the obstacle detector comprises a photobeam-based obstacle detector.

3. The movable barrier operator apparatus of claim 1 wherein the first energy usage comprises at least relatively frequent energization of an obstacle sensor.

4. The movable barrier operator apparatus of claim 3 wherein at least relatively frequent energization comprises substantially continuous energization.

5. The movable barrier operator apparatus of claim 3 wherein the relatively frequent energization of the obstacle sensor includes energization of the obstacle sensor using at least some power from the power supply.

6. The movable barrier operator apparatus of claim 3 wherein the second energy usage comprises, at most, relatively infrequent energization of the obstacle sensor.

7. The movable barrier operator apparatus of claim 6 wherein the relatively infrequent energization comprises substantially no energization.

8. The movable barrier operator apparatus of claim 6 wherein the relatively infrequent energization of the obstacle sensor comprises energization of the obstacle sensor using at least some power from the power supply.

9. The movable barrier operator apparatus system of claim 1 wherein the operating power used in the second the energy usage is less than the operating power used by the first energy usage and the second energy usage corresponds to a quiescent state of a movable barrier as is operably coupled to the movable barrier operator system.

10. The movable barrier operator apparatus of claim 1 wherein the power supply comprises a plurality of power supplies.

11. The movable barrier operator apparatus system of claim 9 wherein the second energy usage comprises an intermittent sleep mode of operation.

12. The movable barrier operator apparatus of claim 1 wherein the state information includes motor state information and the motor state information includes information about motor RPMs, the movable barrier operator further comprising a motor and a motor RPM sensor, and wherein the state information includes motor RPMs.

13. The moveable barrier operator apparatus of claim 1 wherein at least some of the different energy usages have different levels of use of the alternating current such that:

during the first mode of energy consumption operation, the obstacle detector operates using a first level of use of alternating current where the obstacle detector has an increased use of the alternating current; and during the second mode of energy consumption operation, the obstacle detector operates using a second level of use of alternating current, wherein the second level of use of alternating current is lower than the first level of use of alternating current.

14. The movable barrier operator apparatus of claim 1 wherein the state information includes time information which provides information about the barrier being stationary for a period of time.

15. The movable barrier operator apparatus of claim 1 wherein the state information includes transmission state information, the transmission state information including transmissions which effect movement of the barrier.

16. The moveable barrier operator apparatus of claim 1 wherein the state information includes switch state information which switch state information includes the identity of a switch having a status which is effected by movement of the barrier.

17. The movable barrier operator apparatus of claim 1 wherein the state information includes voltage state information which includes information about voltage which is effected by movement of the barrier.

18. A movable barrier operator apparatus as used with a movable barrier, comprising:

a power supply that operably couples to at least one source of alternating current;

obstacle detection means operably coupled to the power supply to receive operating power from the power supply for detecting an obstacle to the movable barrier;

control means operably coupled to the power supply to receive operating power from the power supply and to the obstacle detection means for automatically selectively directly controlling:

opening and closing of the movable barrier; and energy consumption of the obstacle detection means as a function of movable barrier operator system state information that indicates whether the barrier is open or closed and the state information selected from the group consisting of motor state information, time information, transmission state information, voltage state information, switch state information and combinations thereof, the state information effecting a plurality of power consumption modes which are different, at least one of the power consumption mode consuming less power than another power consumption mode.

19. The movable barrier operator apparatus of claim 18 wherein the obstacle detection means comprises photobeam-based obstacle detection mean for detecting an obstacle by detecting an interrupted photobeam.

20. The movable barrier operator apparatus of claim 18 wherein the power supply further comprises energy storage means, such that the energy storage means will provide energy to the obstacle detection means when at least portions of the power supply are rendered non-operable by the control means.

21. A movable barrier operator apparatus comprising:

a power supply that operably couples to at least one source of alternating current;

an obstacle detector; and a movable barrier operator which a controller, the movable barrier operator operably coupled to the power supply, receives operating power from the power supply and has at least a first and a second mode of energy consumption operation and being further configured and arranged to:

selectively open and close a corresponding movable barrier; and develop an obstacle detector operating mode control signal from the controller as a function of movable barrier operator system state information that indicates whether the barrier is travelling, the obstacle detector operating mode control signal being operable to directly control the energy usage of the obstacle detector and the state information selected from the group consisting of motor state information, time information, transmission state information, voltage state information, switch state information and combinations thereof, the obstacle detector operably coupled to the power supply and to the movable barrier operator, receives operating power from the power supply, and has a plurality of operating modes, wherein at least some of the operating modes have different energy usages, and wherein the obstacle detector is directly responsive to the movable barrier operator obstacle detector operating mode control signal such that:

during the first mode of energy consumption operation, the obstacle detector operates using a first energy usage; and during the second mode of energy consumption operation, the obstacle detector operates using a second energy usage, wherein the second energy usage is lower than the first energy usage.

22. The movable barrier operator apparatus of claim 21 wherein the obstacle detector comprises a photobeam-based obstacle detector.

23. The movable barrier operator apparatus of claim 21 wherein the first energy usage personality comprises at least relatively frequent energization of an obstacle sensor.

24. The movable barrier operator apparatus of claim 23 wherein at least relatively frequent energization comprises substantially continuous energization.

25. The movable barrier operator apparatus of claim 23 wherein the relatively frequent energization of the obstacle sensor includes energization of the obstacle sensor using at least some power from the power supply.

26. The movable barrier operator apparatus of claim 23 wherein the second energy usage personality comprises, at most, relatively infrequent energization of the obstacle sensor.

27. The movable barrier operator apparatus of claim 26 wherein the relatively infrequent energization comprises substantially no energization.

28. The movable barrier operator apparatus of claim 26 wherein the relatively infrequent energization of the obstacle sensor comprises energization of the obstacle sensor using at least some power from the power supply.

29. A movable barrier operator apparatus comprising:

a power interface configured to be operably coupled to at least one source of alternating current;

a movable barrier operator configured to be operably coupled to the power interface, to receive operating power, to selectively open and close a corresponding movable barrier, and to have at least a first and a second mode of energy consumption operation, the movable barrier operator comprising:

a motor;

an obstacle detector; and a controller configured to receive movable barrier operator system state information that indicates barrier location, the controller configured to develop an obstacle detector operating mode control signal as a function of the movable barrier operator system state information, the state information selected from the group consisting of motor state information, time information, transmission state information, voltage state information, switch state information and combinations thereof, and the obstacle detector operating mode control signal being operable to directly control the energy usage of the obstacle detector, the obstacle detector, the obstacle detector having a plurality of operating modes at least some of the operating modes having a lower energy usage than another energy usage.

30. The movable barrier operator apparatus of claim 29 wherein the state information includes motor state information and the motor state information includes information about motor RPMs, the movable barrier operator further comprising a motor RPM sensor, and wherein the state information includes motor RPMs.

31. The movable barrier operator apparatus of claim 29 wherein the state information includes time information which provides information about the barrier being stationary for a period of time.

32. The movable barrier operator apparatus of claim 29 wherein the state information includes transmission state information, the transmission state information including transmissions which effect movement of the barrier.

33. The moveable barrier operator apparatus of claim 29 wherein the state information includes switch state information which switch state information includes the identity of a switch having a status which is effected by movement of the barrier.

34. The moveable barrier operator apparatus of claim 29 wherein the state information includes voltage state information which includes information about voltage which is effected by movement of the barrier.

* * * * *

UNITED STATES PATENT AND TRADEMARK OFFICE

CERTIFICATE OF CORRECTION

PATENT NO. : 7,755,223 B2
APPLICATION NO. : 10/227182
DATED : July 13, 2010
INVENTOR(S) : James J. Fitzgibbon It is certified that error appears in the above-identified patent and that said Letters Patent is hereby corrected as shown below:

IN THE CLAIMS:

Column 11, Claim 9, Line 47: After "apparatus" delete "system";

Column 11, Claim 9, Line 48: After "second" delete "the";

Column 11, Claim 11, Line 56: After "apparatus" delete "system"; and

Column 12, Claim 19, Line 53: Change "mean" to -- means --.

Signed and Sealed this

Fifth Day of October, 2010

David J. Kappos
*Director of the United States Patent and Trademark Office*